United States Patent
Viroli et al.

(10) Patent No.: US 10,136,479 B2
(45) Date of Patent: Nov. 20, 2018

(54) HOB WITH FREE CONFIGURABLE HEATING ARRAY AND TOUCHSCREEN CONTROL, METHOD FOR OPERATING A HOB WITH FREE CONFIGURABLE HEATING ARRAY AND TOUCHSCREEN CONTROL AND COMPUTER PROGRAM PRODUCT

(71) Applicant: Electrolux Appliances Aktiebolag, Stockholm (SE)

(72) Inventors: Alex Viroli, Forli (IT); Jérôme Brasseur, Stockholm (SE)

(73) Assignee: Electrolux Appliances Aktiebolag, Stockholm (SE)

(*) Notice: Subject to any disclaimer, the term of this patent is extended or adjusted under 35 U.S.C. 154(b) by 47 days.

(21) Appl. No.: 15/115,745

(22) PCT Filed: Apr. 7, 2015

(86) PCT No.: PCT/EP2015/057491
§ 371 (c)(1),
(2) Date: Aug. 1, 2016

(87) PCT Pub. No.: WO2015/165694
PCT Pub. Date: Nov. 5, 2015

(65) Prior Publication Data
US 2017/0156179 A1    Jun. 1, 2017

(30) Foreign Application Priority Data
Apr. 30, 2014   (EP) .................................. 14166590

(51) Int. Cl.
*H05B 6/12*    (2006.01)
*H05B 6/04*    (2006.01)
(Continued)

(52) U.S. Cl.
CPC ............. *H05B 6/062* (2013.01); *F24C 7/086* (2013.01); *H05B 6/1209* (2013.01); *H05B 2213/03* (2013.01)

(58) Field of Classification Search
CPC ...... H05B 6/062; H05B 6/065; H05B 6/1209; H05B 6/1218; H05B 6/1272;
(Continued)

(56) References Cited

U.S. PATENT DOCUMENTS

2011/0226753 A1* 9/2011 Casanova Lacueva ......................
F24C 7/083
219/462.1

FOREIGN PATENT DOCUMENTS

EP    2440012 A2    4/2012
EP    2480046 A1    7/2012
(Continued)

OTHER PUBLICATIONS

International Search Report issued in PCT/EP2015/057491, dated Jun. 10, 2015, 3 pages.

*Primary Examiner* — Hung D Nguyen
(74) *Attorney, Agent, or Firm* — Pearne & Gordon LLP

(57) ABSTRACT

The invention discloses a hob (100) with free configurable heating array (115) and touchscreen control (130). A user may combine graphic representations (145) and (150) of a first and a second pot in order to combine a control operation of a first and a second heating zone (107, 112) associated to the respective pots. In this manner, plural heating zones can be combined by a single input, and visibility on the touchscreen control is improved by uniting both representations of the pots on the touchscreen control display. Combining/separating heating zones can be effected by the synchronous movement of two fingers uniting the two graphic representations of the pots on the touchscreen respectively diverging the two graphic representations of the pots on the touch-
(Continued)

screen (130). A computer program product (500) allows to easily and freely configure the hob (100) and to perform maintenance and mass production.

15 Claims, 2 Drawing Sheets

(51) Int. Cl.
*H05B 6/08* (2006.01)
*H05B 6/36* (2006.01)
*H05B 6/06* (2006.01)
*F24C 7/08* (2006.01)

(58) Field of Classification Search
CPC .............. H05B 6/1273; H05B 2213/03; H05B 2213/05; H05B 2213/06; F24C 7/083; F24C 7/086
USPC ....... 219/391, 392, 395, 398, 410, 620, 621, 219/622, 626, 656, 664, 665, 671, 672, 219/675, 662
See application file for complete search history.

(56) References Cited

FOREIGN PATENT DOCUMENTS

| EP | 2688365 A1 * | 1/2014 | ............. H05B 6/062 |
| EP | 2688366 A1 | 1/2014 | |
| FR | 2758934 A1 | 7/1998 | |
| WO | 2008122495 A1 | 10/2008 | |
| WO | WO 2008122495 A1 * | 10/2008 | ........... H05B 1/0266 |

* cited by examiner

HOB WITH FREE CONFIGURABLE HEATING ARRAY AND TOUCHSCREEN CONTROL, METHOD FOR OPERATING A HOB WITH FREE CONFIGURABLE HEATING ARRAY AND TOUCHSCREEN CONTROL AND COMPUTER PROGRAM PRODUCT

In the course of constant innovation and progress in automation, home appliances, and in particular kitchen appliances, are subject to constant improvement regarding their flexibility and handling. Kitchen hobs have to be able to adapt to various pot sizes and to be able to maintain cooking temperatures according to a certain temperature profile and for a predetermined time more and more. Further, due to the added functionality and flexibility of kitchen hobs, the user interfaces have to keep pace with the technical features available while at the same time improving the visibility of information and increasing the ease of use of the devices.

The document WO 2009/039989 A1 discloses a cooking device and a method with a cooking device. The cooking device has a group of heating units, a heating group formation unit. In at least one operating mode, upon sliding a cookware into a second position, a heating operating parameter is maintained.

Document EP 2258987 A2 discloses a home appliance with screen and touch input means. A switch element can be assigned with different functions from a control element. No other related prior art is known.

The invention is based on the problem to provide an improved hob with touchscreen control.

This problem is solved by a hob as disclosed herein, a method for operating a hob as disclosed herein and a computer program product as disclosed herein.

Advantageously, a hob according to an embodiment of the present invention combines an array of heating elements, a pot detector, a touchscreen, and a controller for controlling plural heating zones in a manner that an operator can combine at least two heating zones when controlling a respective heating parameter during adjustment. This facilitates the assignment of heating parameters, e.g. in an initial cooking process, respectively allows a reduced screen representation showing two heating zones in a combined mode.

Favorably, according to a further development of an embodiment of the hob according to the present invention, the pot detector is adapted to detect a pot continuously or in time intervals. In this manner, a smooth response to a pot movement can be provided, while on the other hand energy can be saved in adapting pot detection only to points in time that have proven to be important in practical cooking environments.

Favorably, according to a further development of an embodiment of the hob according to the present invention, the touchscreen control concerning a display property regarding at least a first pot can be affected. In this manner, an important menu item, that e.g. is normally showing only in a sub-menu, can be redefined to be a top menu item, e.g. by way of a shortcut that is visible on the touchscreen control.

Beneficially, according to a further development of a hob according to an embodiment of the present invention, this is adapted to separate the first and second heating zones that have been combined based on a touch input. In this manner, two initially combined heating zones can be operated individually in case this is required during the cooking process. Touch control facilitates such an operation and allows a graphic representation on the touchscreen that shows the current status while facilitating the overview over the further control functions of the hob.

Advantageously, according to a further development of an embodiment of the hob according to the present invention, assigning the heating parameters to a first and a second heating zone involves movement detections of the touch input affecting a display representation of a first and a second pot respectively heating zone at the same time. In this manner, intuitively, a user can easily indicate e.g. with a two-finger gesture which heating zones he intends to control.

Favorably, according to a further development of an embodiment of the hob according to the present invention, a converging movement indicates a combination of two heating zones. In this manner, a facilitated operation of the hob is achieved.

Advantageously, according to a further development of an embodiment of the hob according to the present invention, a diverging movement indicates a separation of two heating zones. In this manner, an intuitive touch operation performed by the user and the detected movement regarding two heating zones can be evaluated to associate, respectively dissociate, the control of heating zones in an efficient manner.

Advantageously, according to a further development of the hob according to the present invention, it is constructed as an induction hob. Induction hobs are available in mature versions on the market, and individual heating zones in the form of heating arrays can be manufactured in a reliable manner in sufficient quantities for household appliances.

Advantageously, the method for operating a hob having a free configurable heating array, a pot detection for assigning respective first and second heating zones and a touchscreen control provides for easy control of two individual heating zones by combining them and allowing to adjust a heating parameter of the respective heating zones in one input operation that affects e.g. both of them at the same time, thus facilitating the operation of the hob and reducing the number of input commands required from the user to control the hob.

Favorably, according to a further development of an embodiment of the method according to the present invention, the combination of two heating zones is effected by a converging touch movement effecting synchronously two graphic representations of heating zones on the touchscreen display.

Advantageously, according to a further development of an embodiment of the method according to the present invention, a separation of two heating zones is effected by a diverging movement, e.g. a two-finger gesture effecting a combined representation of a first and a second heating zone, respectively first and second pot, on a touchscreen display.

Favorably, according to a further development of an embodiment of the method according to the present invention, the touchscreen control is adapted to combine a first and a second representation of a first and a second heating zone respectively pot as a consequence of a converging movement and in order to confirm the combined control of the two heating zones.

Favorably, according to a further development of an embodiment of the method according to the present inven-tion, the touchscreen control is adapted to separate a graphic representation of a first and a second combined heating zone/respectively pot to confirm a diverging movement and a separation of the control of the first and the second heating zone.

Advantageously, according to a further development of an embodiment of the method according to the present invention, the touchscreen control is adapted to be configured in a manner that a menu item can be arranged on a top level of a menue structure, respectively presented by way of a shortcut on a touchscreen display. In this manner, all available menus to control the hob can be presented in a manner according to the needs of the user and according to the current cooking situation in a flexible way.

Advantageously, the computer program product according to an embodiment of the present invention allows a flexible configuration of a hob with free configurable heating array and touchscreen control by providing instructions to configure respectively update the functions of the hob and the associated control by means of code stored as instructions on a computer-readable memory. In this manner, mass production of such devices is facilitated and updates of the control software in the field are facilitated.

Subsequently, the invention will further be explained on the basis of examples shown in the drawings, wherein.

Figure 1:
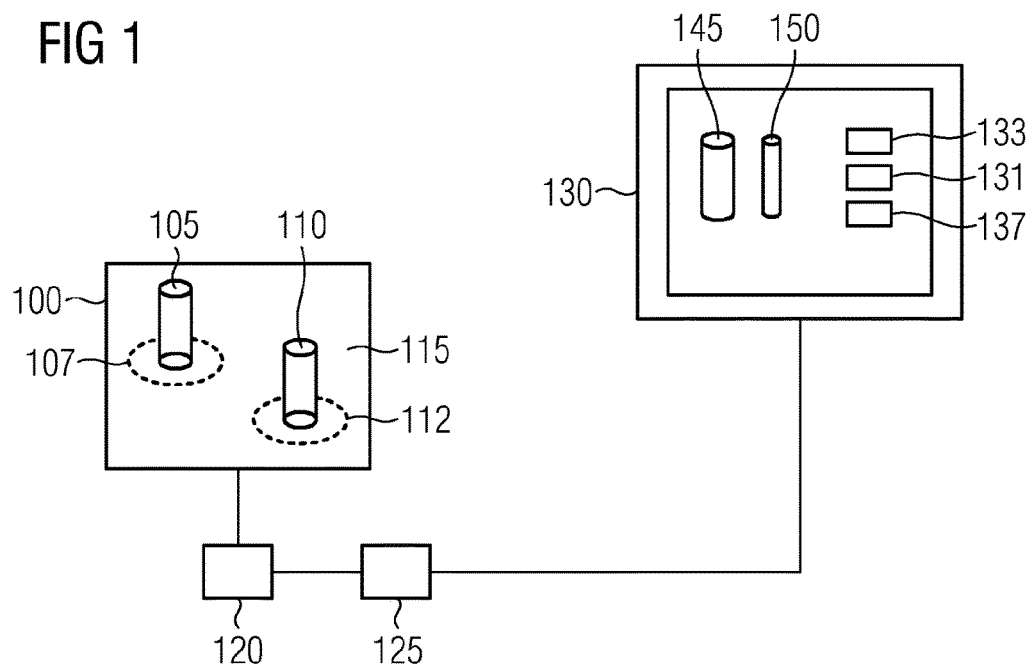
FIG. 1 shows an example of a hob with free configurable heating array and touchscreen control.

As FIG. 1 shows, a preferred embodiment of a hob with free configurable heating array and touchscreen control according to the present invention 100 comprises a free configurable heating array 115 in a manner that individual respective heating elements beneficially present in a matrix can be combined in a way to work as a heating zone together. In case a first pot 105 respectively a second pot 110 is placed on the heating array 115, a pot detector 120 detects their respective presence and assigns respective heating elements underneath the first and second pot 105, 110 to form a heating zone that can be e.g. individually controlled by a controller 125. The inventors have realized that hob control and Screen display can be improved and the operation of the hob facilitated by displaying only required information and allowing a degree of freedom about what is displayed.

Beneficially, the first heating zone 107 and the second heating zone 112 can be of equal or different size in order to cover the outer circumference of a contact surface of a pot on the heating array 115. Here, the first heating zone 107 and the second heating zone 112 are shown to be a little larger than the first pot 105 respectively the second pot 110. The heating elements may be of a resistive nature, or may be constructed as induction heating elements according to the technological needs of the hob. Any other heating elements according to future developments may be used as well.

Further, FIG. 1 shows a touchscreen control 130 that displays graphic representations of the first pot 145 and the second pot 150 on the display. Further, menu items 133, 131 and 137 are shown that allow control of the hob via touch input respectively touchscreen input. The touchscreen control 130 is connected to controller 125. The menu items 133, 131 and 137 may be of hierarchical nature, e.g. menu item 133 may be on a different menu level than menu item 137, e.g. maybe menu item 137 is a sub-menu.

According to a further development of the present invention, menu items may be flexibly assigned, e.g. menu item 133 may be moved into a sub-menu, whereas menu item 137 may be moved on a top level by the user according to his needs. Such a movement may be effected by touchscreen input respectively there may be predefined menu structures available that can be selected by way of a touchscreen input. It is also conceivable that an additional shortcut is presented on the top of the touch screen control that would appear as a new menu item on top of the screen.

The heating array 115, respectively the first heating zone 107 and the second heating zone 112 are respectively controlled by operating the touchscreen control 130 and by indicating a controllable unit in a known manner by touching it on the touchscreen control 130 and selecting a control function, e.g. by touching a menu item 133, 131 or 137. The number of three menu items is just an example. There may be more menu items, and there may be other graphic representations or indications of heating parameters on the touchscreen control, e.g. a user touches the graphic representation 145 in order to control the heating zone 107, e.g. he may adjust a cooking time, respectively a cooking energy, or may start a cooking program that is associated to the food that has to be prepared in the first pot 105 and adapted to provide a predetermined cooking result regarding this food. This can be achieved by touching one of the menu items 133, 131 and 137 or touching one of the menu items, e.g. 133, may lead to a pop-up of a control device in the form of a control knob or sliding control that allows the adjustment of a cooking parameter. Such an adjustment device may only appear momentarily and for a short time in order to improve the visibility on the touchscreen control.

Figure 2:
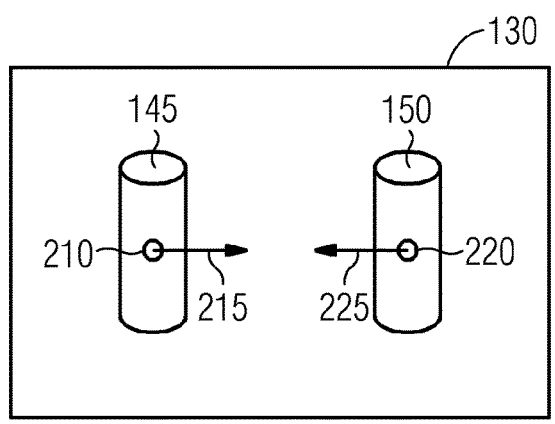
FIG. 2 shows an example of a graphic representation on a touchscreen display.

FIG. 2 shows an example of a touchscreen control 130 and a combination of two heating zones by effecting two graphic representations of a first pot 145 and a second pot 150, e.g. a first finger may touch at a point 210 on the graphic representation of the first pot 145 and a second finger may touch at a point 220 at the graphic representation of a second pot 150 in order to indicate a command affecting both of the heating zones 107 and 112 associated respectively the pots 105 and 112. While touching at the location 110 and 120, as a movement, a converging movement indicated by arrows 215 and 225 may be performed in order to align the graphic representations 145 and 150 on top of each other, or close to each other. Such a touch input may be interpreted by the controller 125 to combine the control of the heating zones 107 and 112 and allow the user to synchronously and jointly control a heating parameter, such as a heating time or a heating power of respectively heating zone 107 and heating zone 112 with one input command.

Further, by representing the first heating zone 107 and the second heating zone 112 in a combined manner on the touchscreen control, it is easier to observe the screen and allows facilitated inspection by the user. A combined control of two heating zones e.g. means that the user enters one input by effecting a menu item or a control unit displayed on the touchscreen control, and for both heating zones 107 and 112 this parameter will be adjusted in the same manner. The number of two heating zones is given as an example here. Without limitation, more heating zones can be combined and controlled in a similar manner.

Figure 3:
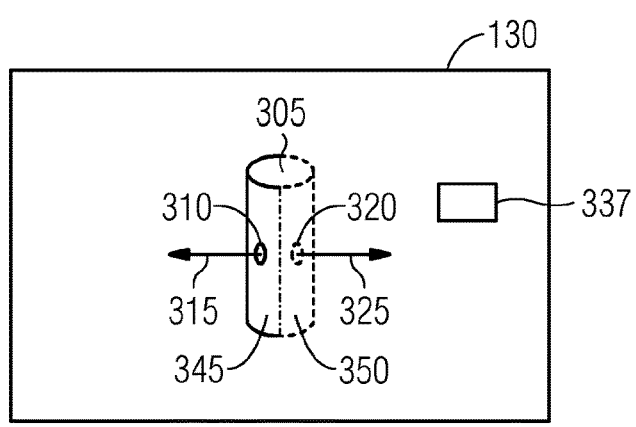
FIG. 3 shows another example of a graphic representation on a touchscreen control.

FIG. 3 shows another example of a touchscreen control according to a further development of an embodiment of the hob according to the present invention. Here, the touchscreen control 130 shows a state where two graphic representations of a first pot 105 and a second pot 110 are displayed in a combined manner 305, indicated by full and dotted lines. In an analogous manner as already explained previously regarding FIG. 2, a user may touch with one finger at a point 310 on a first half of the graphic representation 305 and with another finger at a point 320 at the other half of the graphic representation of the second pot 110. By performing a movement with the two fingers in a way as indicated by arrows 315 and 325, a diverging movement, the graphic representations may be split in a manner that the first representation 345 and the second representation 350 move apart from each other and in a final state, a display as shown in FIG. 2 may be presented. In this manner, the user receives the visual confirmation that the combined control of heating zone 107 and heating zone 112 is terminated and that the respective heating zones can now be controlled individually. In this manner, the user is provided with an intuitive control of an embodiment of the hob according to the present invention and gets an immediate feedback about the control status of individual heating zones of the hob. In this manner, visual display on the touchscreen control is facilitated, the number of required commands to control respective heating zones is reduced and the visibility od the current status is improved.

Figures 4, 5:
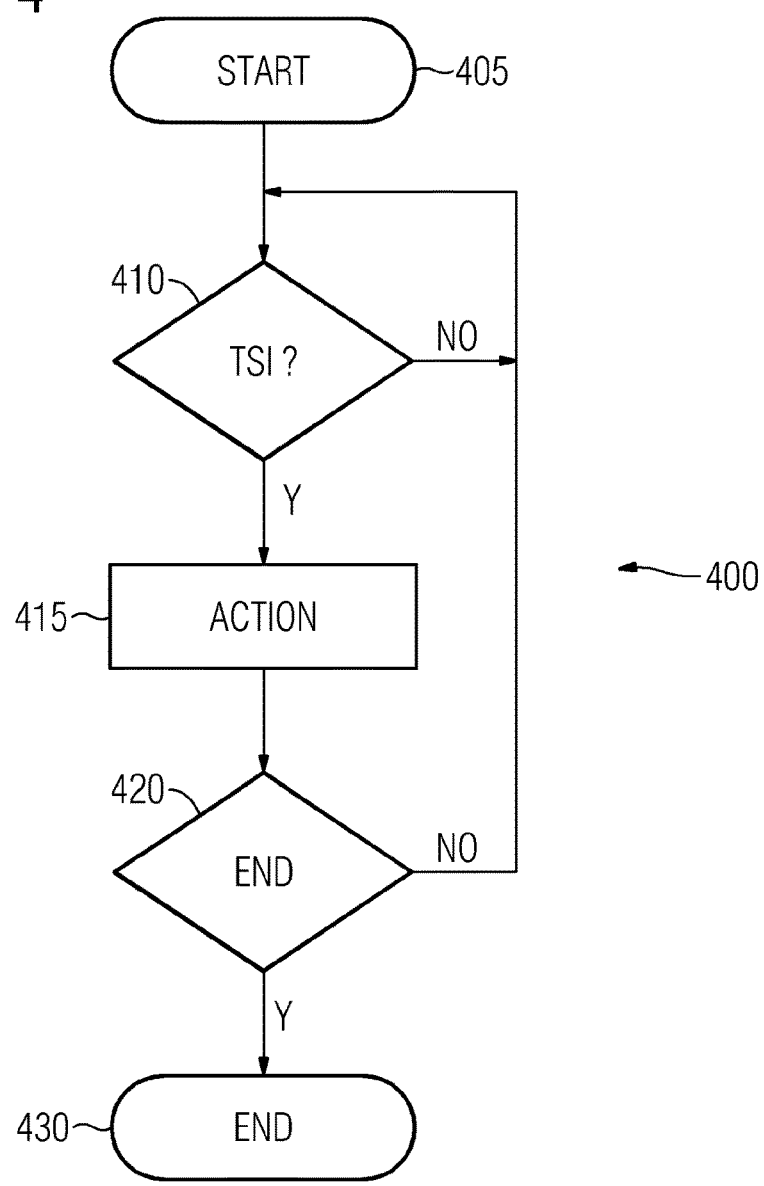
FIG. 4 shows an example of a method according to an embodiment of the present invention.
FIG. 5 shows an example of an embodiment of a computer program product according to the present invention.

FIG. 4 shows an example of an embodiment of a method according to the present invention. At 405, the pot detection is started as well as a loop is started for touchscreen input. At 410, it is evaluated if a touchscreen input is present. If this is the case, a respective activity is performed at step 415. At step 420, it is evaluated if the user wants to finish the cooking process. Here, in addition or alternatively a timer may serve as a trigger. If this is not the case, the process is reverted to step 410 and it is again evaluated if a touchscreen input is present. If no input is present, the loop is again performed. If in step 420, the user decides to terminate the cooking process, the end stage of the method 430 is achieved.

As FIG. 5 shows, a computer program product 500 may consist of a computer-readable memory and instructions 520 that are stored on the computer-readable memory. In this manner, the computer program product may be associated to a hob according to an embodiment of the present invention wirelessly or by means of contacts, and instructions may be read by a controller 120 of the hob in order to configure a method 400 in the form of process steps to be performed by the controller.

LIST OF REFERENCE NUMERALS 100 hob
105 first pot
107 first heating zone
110 second pot
112 second heating zone
115 reconfigurable heating array
120 pot detector
125 controller
130 touchscreen control
133, 131, 137 menu items
145 graphic representation of first pot
150 graphic representation of second pot
210 touchpoint on graphic representation 145
220 touchpoint on graphic representation 150
215 first arrow for indicating converging movement
225 second arrow for indicating converging movement
305 combined representation of first and second pot
310 touchpoint on combined representation
320 second touchpoint on combined representation
315 first arrow for indicating diverging movement on graphic representation
325 second arrow for indicating diverging movement on graphic representation of pots
345 half representation of combined representation of first pot
350 second half of combined representation of second pot 110.
400 method
405, 410, 415, 420, 430 method steps
500 computer program product
520 computer instructions

The invention claimed is:

1. A hob with free configurable heating array and touchscreen control, comprising:
    an array of heating elements configurable at least as a first heating zone and a second heating zone for at least a first pot and a second pot;
    a pot detector for detecting respectively the first pot and the second pot and forming the first heating zone and the second heating zone;
    a touchscreen control to display a first graphic representation of the first pot and a second graphic representation of the second pot respectively first and second heating zones; and
    a controller to control at least a heating parameter of the first heating zone and the second heating zone, wherein the controller is adapted to combine control of the first heating zone and control of the second heating zone for assigning the heating parameter based on a first touchscreen control input involving touching the first graphic representation on the touch screen control, touching the second graphic representation on the touchscreen control, and a converging movement therebetween.

2. The hob according to claim 1, wherein the pot detector is adapted to detect a pot continuously or within a predetermined time interval.

3. The hob according to claim 1, wherein the touchscreen control is adapted to be configured regarding a display property of at least the first pot.

4. The hob according to claim 1, wherein the controller is adapted to separate the first heating zone and the second heating zone based on a second touchscreen control input involving touching the first graphic representation on the touch screen control and touching the second graphic representation on the touchscreen control.

5. The hob according to claim 4, wherein the touchscreen control input involves movement detection affecting a display representation of the first pot and the second pot at the same time.

6. The hob according to claim 5, wherein the second touchscreen control input involves a diverging movement between the first graphic representation and the second representation.

7. The hob according to claim 1, wherein the first touchscreen control input involves movement detection affecting a display representation of the first pot and the second pot at the same time.

8. The hob according to claim 1, wherein the array of heating elements comprises induction heating elements.

9. A method for operating a hob having a free configurable heating array, the method comprising:
    a pot detector detecting a first pot and a second pot and for assigning a first heating zone and a second heating zone from the heating array to at least a-the first detected pot and a the second detected pot from the heating array, respectively;
    a touchscreen control displaying a respective graphic representation of the first pot and the second pot and displaying a respective heating parameter of the first heating zone and the second heating zone, wherein the touchscreen control is adapted to control and adjust the heating parameters for the first heating zone and the second heating zone;

and combining the control and adjustment of the heating parameters for the first heating zone and the second heating zone based on a first touchscreen input involving touching the first graphic representation on the touchscreen control, touching the second graphic representation on the touchscreen control, and a converging movement therebetween.

10. The method according to claim 9, wherein the touchscreen control is adapted to combine a visual the graphic representations of the first pot and the second pot into a combined representation.

11. The method according to claim 9, wherein the touchscreen control is adapted to freely configure a menu hierarchy by at least re-arranging one menu item.

12. The method according to claim 9, further comprising separating the control and adjustment of the heating parameters for the first heating zone and the second heating zone based on a second touchscreen input involving touching the first graphic representation on the touchscreen control and touching the second graphic representation on the touchscreen control.

13. The method according to claim 12, wherein the second touchscreen input involves a diverging movement of the first graphic representation and the second graphic representation.

14. The method according to claim 13, wherein the touchscreen control is adapted to separate an adjoined graphic representation of the first pot and the second pot.

15. A non-transitory computer-readable medium for a touchscreen-operated hob having a free configurable heating array and having instructions stored thereon that, when executed, cause the touchscreen-operated hob to execute the following method steps:

a pot detector detecting a first pot and a second pot and assigning a first heating zone and a second heating zone from the heating array to at least the first detected pot and the second detected pot, respectively;

a touchscreen control displaying a respective graphic representation of the first pot and the second pot and displaying a respective heating parameter of the first heating zone and the second heating zone, wherein the touchscreen control is adapted to control and adjust the heating parameters for the first heating zone and the second heating zone;

and combining the control and adjustment of the heating parameters for the first heating zone and the second heating zone based on a first touchscreen input involving touching the first graphic representation on the touchscreen control, touching the second graphic representation on the touchscreen control, and a converging movement therebetween.

* * * * *